United States Patent [19]
Goolsby et al.

[11] Patent Number: 5,958,219
[45] Date of Patent: Sep. 28, 1999

[54] METALS PASSIVATION BY MAGNETIC TREATMENT TO PERMIT HIGHER METALS LEVELS ON FCC CATALYST

[75] Inventors: Terry L. Goolsby, Katy, Tex.; Charles E. Mink, Huntington, Ohio; Howard F. Moore, Catlettsburg, Ky.

[73] Assignee: The M. W. Kellogg Company, Houston, Tex.

[21] Appl. No.: 09/022,982

[22] Filed: Feb. 12, 1998

Related U.S. Application Data

[60] Provisional application No. 60/037,686, Feb. 12, 1997, provisional application No. 60/037,687, Feb. 12, 1997, provisional application No. 60/037,688, Feb. 12, 1997, and provisional application No. 60/038,818, Feb. 12, 1997.

[51] Int. Cl.$^6$ ............................. C10G 47/00; C10G 11/18
[52] U.S. Cl. ........................ 208/108; 208/106; 208/107; 208/113; 502/521
[58] Field of Search ..................................... 208/106, 107, 208/108, 113; 502/521

[56] References Cited

U.S. PATENT DOCUMENTS

| | | |
|---|---|---|
| Re. 31,439 | 11/1983 | Rosenweig . |
| Re. 35,046 | 10/1995 | Hettinger, Jr. et al. . |
| 3,711,422 | 1/1973 | Johnson et al. . |
| 4,359,379 | 11/1982 | Ushio et al. . |
| 4,406,773 | 9/1983 | Hettinger et al. ....................... 208/120 |
| 4,482,450 | 11/1984 | Ushio et al. . |
| 4,727,623 | 3/1988 | Thompson et al. . |
| 4,823,102 | 4/1989 | Cherian et al. . |
| 4,882,043 | 11/1989 | Jung . |
| 5,147,527 | 9/1992 | Hettinger . |
| 5,171,424 | 12/1992 | Hettinger . |
| 5,190,635 | 3/1993 | Hettinger . |
| 5,198,098 | 3/1993 | Hettinger, Jr. . |
| 5,230,869 | 7/1993 | Hettinger et al. ....................... 422/144 |
| 5,250,482 | 10/1993 | Doctor . |
| 5,328,594 | 7/1994 | Hettinger . |
| 5,364,827 | 11/1994 | Hettinger et al. . |
| 5,393,412 | 2/1995 | Hettinger . |
| 5,448,803 | 9/1995 | Morell . |
| 5,538,624 | 7/1996 | Hettinger . |

OTHER PUBLICATIONS

Magnet Terminology Glossary, Magnet Sales and Manufacturing, Inc.

*Primary Examiner*—Walter D. Griffin
*Assistant Examiner*—Tam M. Nguyen
*Attorney, Agent, or Firm*—Kellogg Brown & Root, Inc.

[57] ABSTRACT

A process for metals passivation of metals-contaminated equilibrium catalyst (ECat) used in a fluidized catalytic cracking (FCC) process is disclosed. Repeated treatment of a slip stream of ECat in a high-strength magnetic field, preferably a magnetic catalyst separator, changes the properties of the ECat, promoting growth of relatively large crystals or deposits of metal deposits on ECat which are less catalytically poisonous. Magnetic conditioning permits an increase in metals levels on ECat from, e.g., 3000 to 4000 ppm, without increasing hydrogen and/or coke make. Metals passivation by magnetic conditioning can also be used to concentrate feed metals on the oldest catalyst in the unit. This allows magnetic separation of the oldest catalyst in the unit after 1–6 months of magnetic conditioning, even though feed metals levels are otherwise insufficient to permit effective magnetic catalyst separation.

21 Claims, 4 Drawing Sheets

METALS PASSIVATION BY MAGNETIC TREATMENT TO PERMIT HIGHER METALS LEVELS ON FCC CATALYST

CROSS-REFERENCE TO RELATED APPLICATIONS

This application claims the benefit under 35 USC §119(e) of provisional U.S. Ser. Nos. 60/037,686, 60/037,687, 60/037,688, and 60/038,818, all filed Feb. 12, 1997, and all of which are incorporated by reference herein.

FIELD OF THE INVENTION

The invention relates to the fluidized catalytic cracking (FCC) process, and more particularly to metals passivation by magnetic conditioning of the catalyst.

BACKGROUND OF THE INVENTION

The FCC process is well known and widely used to convert heavy feeds to lighter products. In the early days of FCC, more than 50 years ago, refineries processed distilled feeds over amorphous catalyst to produce cracked products. With the development of zeolite-based cracking catalysts, and short contact-time reactors, the FCC process has been able to crack progressively heavier feeds. Many FCC units now process feeds containing significant amounts of non-distillable or residual materials. These heavy feeds can be profitably cracked, but tend to have a high metal content, usually Fe, Ni and V. The Ni and V are considered poisons in the FCC process, which operates in the absence of added hydrogen. Excessive metals deposition on the catalyst causes production of excessive amounts of coke and large amounts of hydrogen.

Refiners have developed several ways to cope with high-metals feeds. Some refiners deasphalt the feed to remove the worst of the metal-containing components of the crude. Some refiners hydrotreat the feed, which deposits significant amounts of feed metals on the hydrotreating catalyst, thus protecting the FCC catalyst. One promising approach is metals passivation, addition of some element or compound which "passivates" or restrains the catalytic activity of metals deposited on the FCC catalyst.

U.S. Pat. No. 3,711,422 to Johnson, discloses adding antimony to an FCC unit to passivate metals in the feed. Many refiners are reluctant to add metals to their FCC units. Addition of metals such as Sb significantly increases the cost of the operation and creates the potential for adverse environmental impact. The added passivating metal must eventually go somewhere, either on the FCC catalyst, or perhaps deposited on the metal walls of the FCC unit.

A somewhat different approach to metals management in FCC units is the magnetic catalyst separation process recently developed and commercialized by the M W Kellogg Technology Company. This process removes a slipstream of circulating equilibrium catalyst (ECat), on the order of 10–40 tons/day, and processes this in a magnetic separation device which resolves the ECat into a high-metals fraction (which is discarded) and a lower-metals fraction which can be recycled to the FCC unit. Some details of the magnetic separation process may be found in one or more of the following patents: U.S. Pat. No. 4,406,773 to Hettinger, Jr. et al.; U.S. Pat. No. Re. 35,046 to Hettinger, Jr. et al.; U.S. Pat. No. 5,147,527 to Hettinger, Jr. et al.; U.S. Pat. No. 5,171,424 to Hettinger; U.S. Pat. No. 5,190,635 to Hettinger; U.S. Pat. No. 5,198,098 to Hettinger, Jr.; U.S. Pat. No. 5,230,869 to Hettinger et al.; U.S. Pat. No. 5,328,594 to Hettinger; U.S. Pat. No. 5,364,827 to Hettinger et al.; U.S. Pat. No. 5,393,412 to Hettinger; and U.S. Pat. No. 5,538,624 to Hettinger; all of which are hereby incorporated by reference.

It is widely known that magnetic separation can be used to remove a high-metals catalyst from lower-metals catalyst. This separation can be effected using batch or continuous processing, with the catalyst suspended in air, liquid, or disposed on a moving belt.

SUMMARY OF THE INVENTION

During the course of our work on commercializing the magnetic catalyst separation process, we discovered something which had never before been reported in the literature, so far as we know. We found we could make mini-magnets from material with almost no metal on it. These mini-magnets kept their magnetism at 1000°–1400° F. while continuously being bumped by other particles and the walls of the FCC unit.

We discovered that the magnetic separation process, in addition to removing the high-magnetic material, changed the properties of the lower-metal material recycled to the cracking reactor. We could use the magnetic separation process to reject bad catalyst, and to change the properties of the low-metals catalyst recycled to the unit so that it acted somewhat like a metal trap.

We believe we were able, by extended ex-situ magnetic processing of ECat, to promote the growth of larger crystals of metal deposits on the ECat. These larger crystals were both easier to find (more susceptible to subsequent processing by magnetic separation means) and attractive to feed metals, apparently allowing new metal deposits to block old metal deposits.

Somehow we had magnetized the ECat and this magnetism survived bumping and bouncing in the FCC and 1300°–1400° F. temperatures, and cycling from oxidizing to reducing atmospheres every 10 to 15 minutes. We found a way to use this discovery to increase metals levels on circulating ECat. We could also use magnetic separation in FCC where the metals levels in feed and on ECat were thought to be too low, permitting magnetic removal of old catalyst despite low metals levels.

Our process for the fluidized catalytic cracking (FCC) of a metals-contaminated hydrocarbon feed to lighter products comprises mixing a metals-contaminated, crackable hydrocarbon feed with a source of hot regenerated catalyst in a cracking reaction zone to produce a mixture of cracked products and spent catalyst containing metals deposited on the catalyst during the cracking reaction, separating the spent catalyst from the cracked products, removing the cracked products from the process, stripping spent catalyst in a catalyst stripping zone by contact with stripping vapor to remove strippable hydrocarbons from the spent catalyst and produce stripped catalyst, regenerating the stripped catalyst in a catalyst regenerator at catalyst regeneration conditions by contact with oxygen or an oxygen-containing gas to produce regenerated, metals-contaminated catalyst which is recycled to the cracking reaction zone, at least periodically removing catalyst from the FCC process to produce a flowing slipstream of metals-contaminated equilibrium FCC catalyst, magnetizing or magnetically conditioning the metals-contaminated catalyst by passage through a magnetic field of sufficient strength to at least temporarily magnetize the metal-contaminated catalyst and produce conditioned catalyst, recycling at least a portion of the conditioned catalyst to the FCC unit, cracking additional quantities of metal-contaminated feed with the conditioned catalyst and depositing additional amounts of feed metal on the conditioned catalyst, and increasing the metals level on the conditioned ECat by at least 25 weight percent, without an increase in hydrogen yield or coke make, as compared to the process operating at the same conditions prior to use of conditioned catalyst.

In another aspect, the present invention provides a process for the fluidized catalytic cracking (FCC) of a metals-contaminated hydrocarbon feed to lighter products, comprising mixing a crackable hydrocarbon feed containing at least one of Ni, Fe and V and compounds thereof with a source of hot regenerated catalyst in a cracking reaction zone to produce a mixture of cracked products and spent catalyst containing Ni, Fe and/or V and coke deposited on the catalyst during the cracking reaction, separating the spent catalyst from the cracked products, removing the cracked products from the process, stripping spent catalyst in a catalyst stripping zone by contact with stripping vapor to remove strippable hydrocarbons from the spent catalyst and produce stripped catalyst containing coke and Ni, Fe and/or V, regenerating the stripped catalyst in a catalyst regenerator at catalyst regeneration conditions by contact with oxygen or an oxygen-containing gas at a temperature of 1000°–1500° F. in a fluidized bed to produce regenerated, Ni-, Fe- and/or V-contaminated catalyst containing an initial level of metal which is recycled to the cracking reaction zone, continuously removing catalyst from the FCC process to produce a flowing slipstream of Ni-, Fe- and/or V-contaminated equilibrium FCC catalyst (ECat), magnetizing or magnetically conditioning the metals-contaminated ECat by passage through a magnetic field of sufficient strength to at least temporarily magnetize the metal-contaminated ECat and produce conditioned ECat, magnetically and inertially separating the conditioned ECat into a relatively high metal fraction which is discarded and a magnetized relatively low metal catalyst fraction, recycling to the FCC unit the relatively low metal fraction, cracking additional quantities of Ni-, Fe- and/or V-contaminated feed with the magnetized low metal catalyst and depositing additional amounts of feed metal on the magnetized, low metal catalyst, and increasing the metals level on the conditioned ECat by at least 25 weight percent as compared to the initial metal level before magnetic conditioning without increasing hydrogen yield or coke make, as compared to the process operating at the same conditions prior to use of conditioned ECat.

In yet another aspect, the present invention provides, in a process for the fluidized catalytic cracking (FCC) of a hydrocarbon feed containing Ni, Fe and/or V and compounds thereof (Metals) which deposit on a circulating stream of equilibrium catalyst (ECat) used in the FCC unit to crack the feed, wherein feed Metals and normal Metals levels on the circulating ECat are insufficient to require either metals passivation by adding conventional metal passivators such as Sb, Zr and the like or catalyst replacement to control metals levels, and wherein catalyst replacement occurs on a daily to weekly basis to maintain catalyst activity rather than control Metals content of circulating ECat, the improvement comprising continuously removing a portion of ECat from the unit, magnetizing or magnetically conditioning the ECat by passage through a magnetic separation unit magnetic field of sufficient strength to at least temporarily magnetize the metal-contaminated ECat and produce a magnetically conditioned ECat, recycling the conditioned ECat to the FCC unit, and cracking additional quantities of metal-contaminated feed with the conditioned ECat. The magnetizing or magnetically conditioning step preferably includes passing the catalyst through an electromagnetic field or the magnetic field of a permanent magnet. Preferably, the step of magnetizing or magnetically conditioning the catalyst includes processing the removed ECat through a magnetic separator, wherein the conditioned ECat contains a 20 weight percent most metals contaminated fraction, wherein the recycled conditioned ECat contains from 50 to 100 percent of the most metal contaminated fraction for at least a one month period, and wherein after the at least one month period of operation, at least a majority of the most metal contaminated fraction is recycled, and then wherein the operation of the magnetic catalyst separation unit to reject at least a major portion of the most metal contaminated fraction from the unit.

DESCRIPTION OF THE PREFERRED EMBODIMENTS

Figure 1:
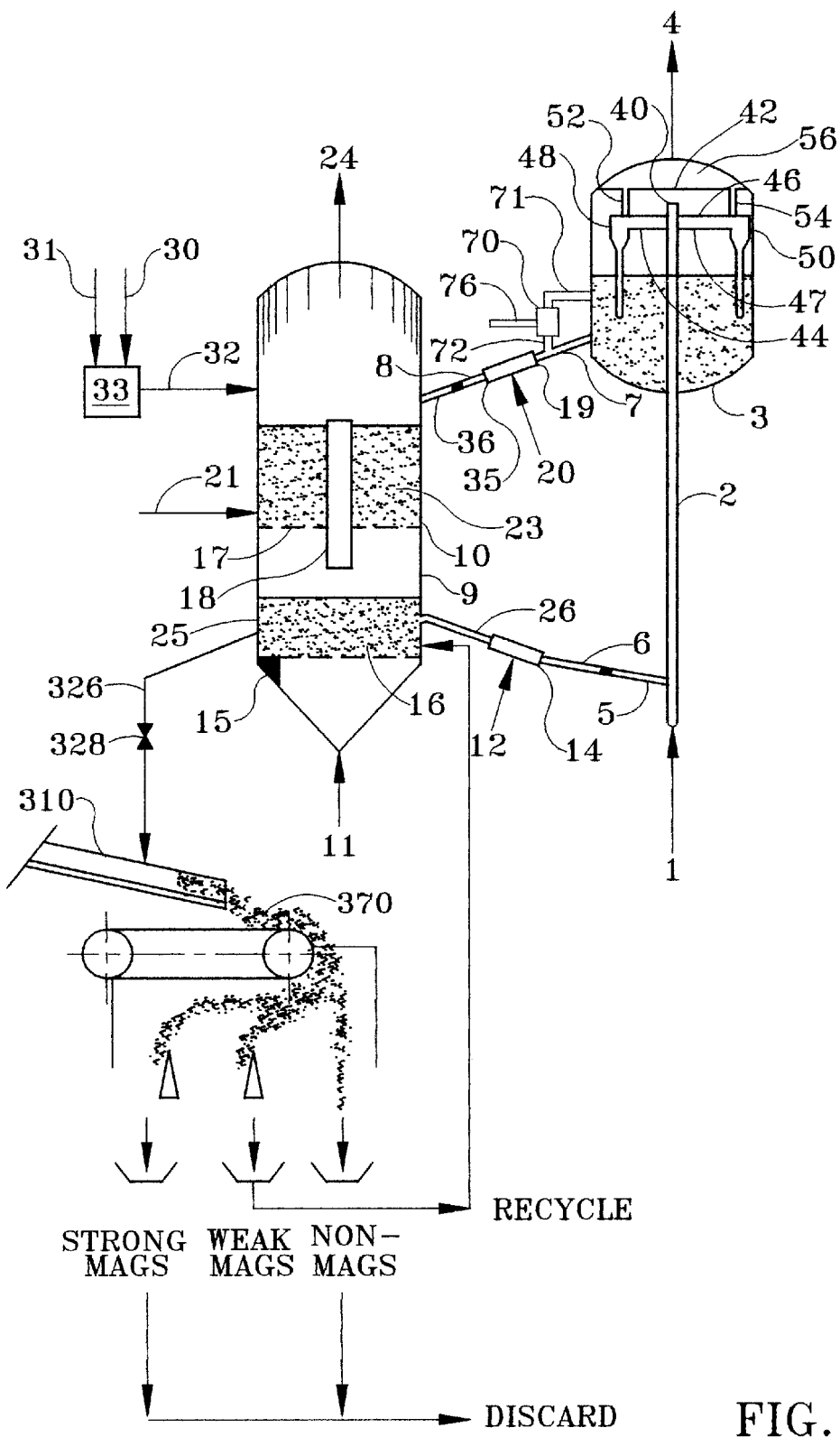
FIG. 1 shows an FCC reactor, regenerator, and magnetic separation process from FIG. 1 of U.S. Pat. No. 5,147,527.

Referring in detail to FIG. 1 (from U.S. Pat. No. 5,147,527) petroleum feedstock is introduced into the lower end of riser reactor 2 through inlet line 1, at which point it is mixed with hot regenerated catalyst coming through line 5 and stripper 14 from regenerator 9.

The feedstock is catalytically cracked in passing up riser 2 and the product vapors are ballistically separated from catalyst particles in vessel 3. Riser 2 is of the vented type having an open upper end 40 surrounded by a cup-like member 42 which preferably stops just below the upper end 40 of the riser so that the lip of the cup is slightly upstream of the open riser tube as shown in FIG. 1. A pair of product vapor lines 44, 46 communicate with the interior of the cup so as to discharge product vapors entering the cup from the vapor space of vessel 3. the cup forms an annulus 47 around and concentric to the upper end of the riser tube. The product vapors then make a further turn or change in direction of about 90° as they enter product lines 44 and 46. The product vapors then enter cyclone separators 48, 50 having overhead conduits 52, 54, respectively which convey the vapors to line 4 through a common header 56.

The catalyst, contaminated with coke, is removed from separator vessel 3 and passed into regenerator 9 through line 7. Stripped catalyst is introduced into bed 23 in upper zone 10 of regenerator 9 through line 36. The rate of flow of catalyst into zone 10 is controlled by valve 8. A small stream of catalyst is removed from vessel 3 through line 71 to magnetic separator 70. That portion passing through the magnetic field is passed on to line 7 and the particles trapped in the magnetic field are removed and discarded through line 76.

Makeup catalyst, whether virgin or used, is introduced through lines 30 and 31 into solids feeder 33 and then through line 32. Oxidizing gas, such as air, is introduced into zone 10 through line 21. A portion of the coke on the catalyst is burned in zone 10 and the partially regenerated catalyst flows downwardly through conduit 18 into lower regeneration zone 25.

An oxidizing gas, such as air, is introduced into regeneration zone 25 through line 11. The oxidizing gas flows through gas distribution plate 15 and thus into the bed 16 of catalyst particles. This mixture passes upwardly through the bed 16 of coke-contaminated catalyst particles, fluidizing it as well as reacting with the coke, and passes through perforated plate 17 into the bed of catalyst particles in zone 10.

The perforations in the plate 17 are large enough so that the upwardly flowing gas readily passes therethrough into zone 10. During regeneration of the catalyst the pressure difference between the upper and lower zones 20,10 prevents catalyst particles from passing downwardly through the plate 17. Gases within the regenerator comprising combustion products, nitrogen and possibly additives for combustion control, such as steam and/or chlorine, are separated from suspended catalyst particles by a separator (not shown) and then pass out of the regenerator 9 through line 24.

Regenerated catalyst is removed from zone 25 through conduit 26 for return to riser 2 through the stripper 14, the rate of removal being controlled by valve 6.

A stripping gas such as steam is introduced into stripper 19 through line 20 to remove volatiles from the catalyst. The volatiles pass from the stripper through line 7 into vessel 3 and eventually out through line 4. Similarly a stripper gas, such as steam is introduced into stripper 14 through line 12 to remove absorbed nitrogen from the regenerated catalyst before it is returned to the reactor 2. The stripped gases pass through line 26 into the regenerator 9.

A portion of the regenerated catalyst from zone 25 is removed through conduit 326 past valve 328 to spreader 310. It is understood that the conduit and valve 326 are schematic and may in fact involve a cooling process and/or a stripping process.

Figure 2:
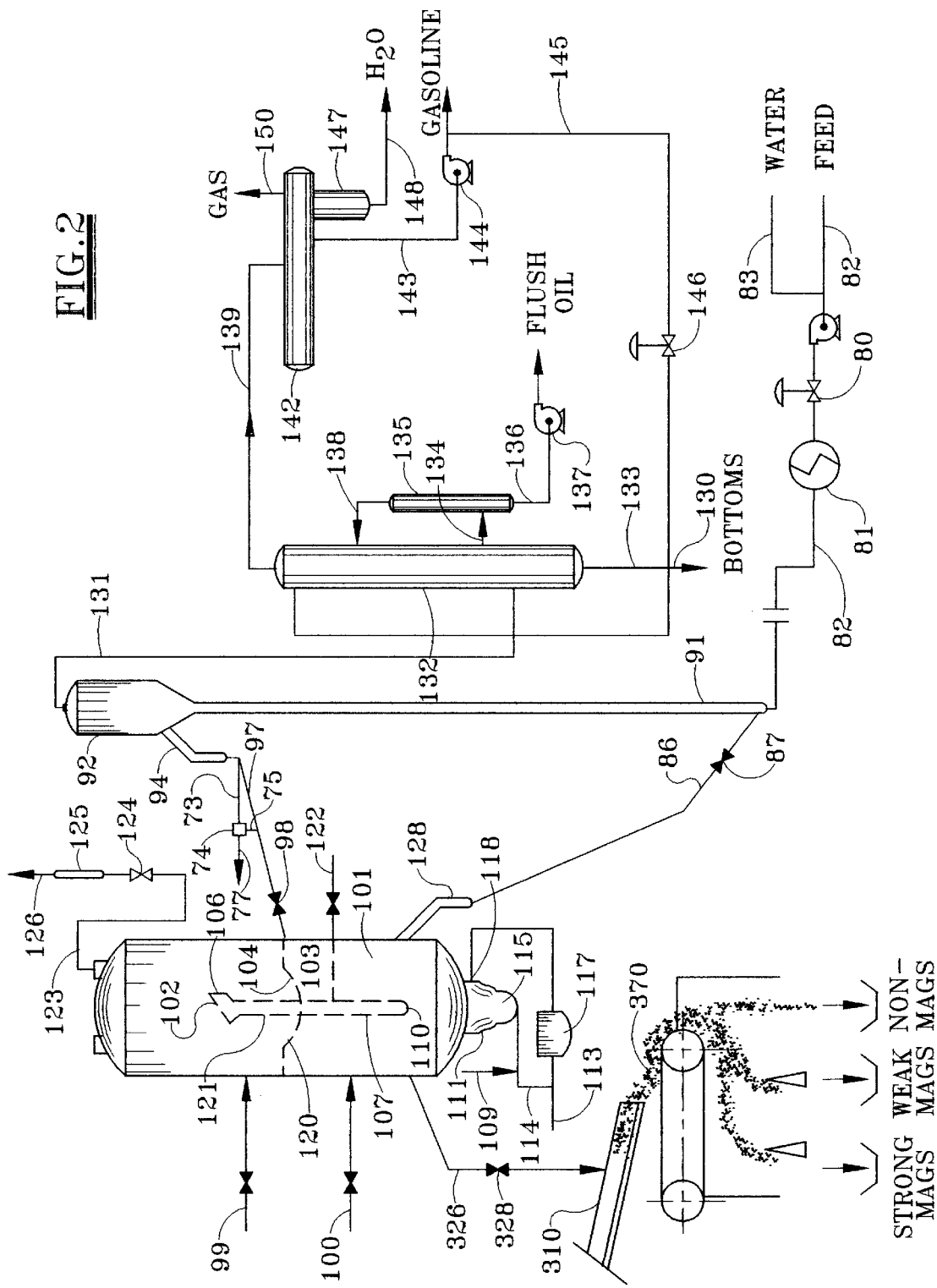
FIG. 2 shows an FCC unit, magnetic separator, and fractionation equipment, from FIG. 2 of U.S. Pat. No. 5,147,527.

With reference to FIG. 2, reference numeral 80 identifies a feed control valve in feedstock supply pipe 82. Supply pipe 83 (when used) introduces liquid water and/or an additive solution into the feed. Heat exchanger 81 in supply pipe 82 acts as a feed preheater, whereby preheated feed material may be delivered to the bottom of a riser type reactor 91. Catalyst is delivered to the reactor through catalyst standpipe 86, the flow of catalyst being regulated by a control valve 87.

The reactor is equipped with a disengagement vessel 92 similar to the disengagement vessel 3 of the reactor shown in FIG. 1. Catalyst departs disengagement vessel 92 through stripper 94. Spent catalyst passes from stripper 94 to regenerator 101 via spent catalyst transfer pipe 97 having a slide valve 98 for controlling flow.

A sidestream of catalyst is passed to distributor 310 through line 326. That portion passing through the magnetic field is returned to line 97 through a line not shown in the figure.

Regenerator 101 is divided into upper chamber 102 and lower chamber 103 by a divider panel 104 intermediate the upper and lower ends of the regenerator vessel. The spent catalyst from transfer pipe 97 enters upper chamber 102 in which the catalyst is partially regenerated. A funnel-like collector 106 having a bias-cut upper edge receives partially regenerated catalyst from the upper surface to the dense phase of catalyst in upper chamber 102 and delivers it, via dropleg 107 having an outlet 110, beneath the upper surface of the dense phase of catalyst in lower chamber 103. Make up catalyst or regenerator additives may be added to the upper chamber 102 and/or the lower chamber 103 through lines 99 and 100 respectively.

Air is supplied to the regenerator through an air supply pipe 113. A portion of the air travels through a branch supply pipe 114 to bayonet 115 which extends upwardly into the interior of plenum 111 along its central axis. Catalyst in chamber 103 has access to the space within plenum 111 between its walls and bayonet 115. The remainder of the air passing through air supply pipe 113 may be heated in air heater 117 and is then introduced into inlet 118 of the ring distributor, which may be provided with holes, nozzles or other apertures which produce an upward flow of gas to fluidize the partially regenerated catalyst in chamber 103.

The air in chamber 103 completes the regeneration of the partially regenerated catalyst received via drop leg 107. The amount of air supplied is sufficient so that the resultant combustion gases are still able to support combustion upon reaching the top of chamber 103 and entering chamber 102. Drop leg 107 extends through an enlarged aperture in panel 104, to which is secured a gas distributor 120 which is concentric with and surrounds a drop leg. Combustion supporting gases from chamber 103, which have been partially depleted, are introduced via gas distributor 120 into upper regenerator chamber 102 where they contact incoming coked catalyst from coked catalyst transfer pipe 97. Apertured probes 121 in gas distributor 120 assist in achieving a uniform distribution of the partially depleted combustion supporting gas into upper chamber 102. Supplemental air or cooling fluids may be introduced into upper chamber 102 through a supply pipe 122, which may also discharge through gas distributor 120.

Fully regenerated catalyst with less than about 0.25% carbon, preferably less than about 0.1% and more preferably less than about 0.05%, is discharged from lower, regenerator chamber 103 through regenerated catalyst stripper 128, whose outlet feeds into catalyst standpipe 86. Thus, regenerated catalyst is returned to riser 91 for contact with additional fresh feed.

Coked catalyst from transfer line 97, with a relatively high loading of carbon, contacts combustion supporting gases in chamber 102 which have already been at least partially depleted of oxygen by the burning of carbon from partially regenerated catalyst in lower chamber 102. Because of this, it is possible to control both the combustion of carbon and the quantity of carbon dioxide produced in upper regeneration chamber 102. Although regenerating gas introduced through air supply pipe 113 and branch conduit 114 may contain relatively large quantities of oxygen, the partially regenerated catalyst which it contacts in lower chamber 103 has already had a major portion of its carbon removed. The high oxygen concentration and temperature in chamber 103 combine to rapidly remove the remaining carbon in the catalyst, thereby achieving a clean, regenerated catalyst with a minimum of heat release. The regeneration off gases are discharged from upper chamber 102 via gas pipe 123, regulator valve 124, catalyst fines trap 125 and outlet 126.

The vapor products from disengagement vessel 92 are discharged through vapor line 131 to fractionator 132. Fractionator 132 includes a bottoms outlet 133, side outlet 134, flush oil stripper 135, and stripper bottom line 136 connected to pump 137 for discharging flush oil. Overhead product from stripper 135 returns to fractionator 132 via line 138.

The main overhead discharge line 139 of the fractionator is connected to an overhead receiver 142 having a bottoms line 143 feeding into pump 144 for discharging gasoline product. A portion of this product may be returned to the fractionator via recirculation line 145, the flow being controlled by valve 146. The receiver 142 also includes a water receiver 147 and a water discharge line 148. The gas outlet 150 of the overhead receiver discharges a stream which is mainly $C_5$ and lighter but containing some $C_5$, $C_6$ and $C_7$ material. If desired, the $C_5$ and heavier material in the gas stream may be separated by compression cooling and fractionation, and recycled to receiver 142.

The oxidizing gas, such as air, introduced into regeneration zone 103 through line 114 may be mixed with a cooling spray of water from a conduit 109. The mixture of oxidizing gas and atomized water flows through bayonet 115 and thus into the lower bed of catalyst particles.

The apertures in distributor 120 are large enough so that the upwardly flowing gas readily passes into zone 102. However, the perforations are sized so that the pressure difference between the upper and lower zones prevents catalyst particles from passing downwardly through the distributor. The bayonet 115 and distributor are similarly sized. Gases exiting the regenerator are separated from suspended catalyst particles by a cyclone separator (not shown) and then pass out of the regenerator through discharge conduit 123.

The above descriptions are taken from U.S. Pat. No. 5,147,527, which disclosed an FCC process and apparatus which may be used to carry out the process of the present invention. There are other types of FCC units, and other types of magnetic separation and/or conditioning that can be used, though not necessarily with equivalent results.

We believe that the key element in using magnetic fields to passivate the catalyst is repeated contact of ECat with a strong magnetic field, preferably coupled with a gradual reduction in magnetic field strength as the catalyst is "magnetized" and a change in operating procedure to allow the circulating catalyst to have higher metals levels than were used previously.

The magnetic separator is preferably a rare earth roller magnetic separator (RERMS) configured as follows:

| | |
|---|---|
| Magnet Field Strength, gauss | 5,000 to 25,000 |
| Belt Thickness, mil | 5 to 60 |
| Magnet Diameter, inches | 3 to 4 |
| Magnet Length, inches | 2 to 80 |
| Magnet Material | Iron, Samarium-Cobalt, Neodymium-Iron-Boron |
| Belt Speed | Revolutions per Minute 0–350 |
| | Feet per Minutes 0–340 |

In a preferred embodiment, radial neodymium-iron-boron magnets are stacked SN-NS-SN-NS etc., using a 10 mil KEVLAR belt to obtain a 20,000 gauss magnetic field strength.

In practice magnetic passivation does not happen overnight, or even within a month. Perhaps something happens after one month, with the full effect not usually seen until two months, six months or even a year elapses. A curious feature of this invention is that the more the catalyst passes through the magnetic separation process, the better the catalyst recycled to the unit becomes at following a corollary to Markovnikov's rule: the ECat with the most metals attracts the most metals from the feed. Metals in the incoming feed preferentially deposit on relatively large deposits, possibly large crystals of magnetized metal already present on the cracking catalyst.

The larger crystal sizes associated with the magnetically treated catalyst, or perhaps the residual magnetism of the magnetized catalyst, makes the metals-rich, magnetized ECat more attracted to magnetic fields than conventional ECat. Thus, in the magnetic separation we prefer to reduce the strength of the magnetic field or increase the opposing inertial forces, or both, after a few months of operation as the size of the metal crystals on the ECat increases.

Finally, it is important to disregard the conventional wisdom regards metals levels, and reduce the strength of the magnetic field (and/or increase the opposing inertial forces) as needed to allow metals content (Ni+V) on equilibrium catalyst to increase by at least 25% above the levels previously tolerable in the unit prior to or without magnetic separation.

In one commercial unit, we were able to increase by roughly 33% the amount of metals that could be tolerated on the catalyst without any adverse effect. The ECat Ni+V level was roughly 3000 ppm before the MagnaCat® unit started. After about six months of operation with magnetic separation and conditioning, we could tolerate roughly 4000 ppm Ni+V without any adverse effect. See FIG. 4 which shows that gasoline selectivity increased even though the Ni+V levels were increased. The magnetized ECat with 4000 ppm metals behaved like conventional ECat with 3000 ppm metals.

Magnetized catalyst makes less hydrogen for a given ppm metal as compared to conventional ECat and also produces less coke.

We do not wish to be bound by our theory of metals deposition; it may be that some utterly different mechanism is responsible for achieving the metals passivation effect.

In many units iron content, and/or nickel and vanadium content, varies seasonally with the amount of heavy material fed to the cracker. It is beneficial to at least periodically analyze the feedstock for metal content, and adjust operation of the magnetic separation unit accordingly so that a relatively constant amount of material is rejected. The magnetic separation unit is itself a fairly a good indicator of metals level, and belt speed can be adjusted as needed to maintain the desired ratio of reject/recycled catalyst.

EXAMPLE

A 3" stacked magnet rare earth roller magnetic separator (RERMS) was used with an FCC unit previously operated without magnetic separation or conditioning. The magnets were stacked in bucking configuration, i.e., NN SS NN, etc. The catalyst was dumped or vibrated onto a 10 mil KEVLAR belt passing over the 3" RERMS magnetic. At startup a fairly high belt velocity was used, on the order of 285 fpm, then after 1–2 months the belt velocity was decreased to 110 fpm after the most metals-contaminated catalyst was removed, and eventually increased after a few more months of operation to 250–310 fpm. Data for the FCC unit are presented in Table 1 below and FIGS. 3 and 4.

TABLE 1

| Description of ECat MAT Vol % Conversion | Before magnetic separation | | After magnetic separation | |
|---|---|---|---|---|
| MAT Yields (Normalized) | 70.0 vol % | wt % | 70.0 vol % | wt % |
| Gasoline ($C_5$-221° C.) | 59.41 | 48.91 | 63.31 | 52.26 |
| Gasoline Selectivity | 83.70 | | 90.00 | |

TABLE 1-continued

| Description of ECat MAT Vol % Conversion | Before magnetic separation | | After magnetic separation | |
|---|---|---|---|---|
| MAT Yields (Normalized) | 70.0 vol % | wt % | 70.0 vol % | wt % |
| Total C$_4$'s | 12.83 | 8.43 | 11.3 | 7.42 |
| Isobutane | 6.04 | 3.82 | 5.56 | 3.51 |
| N-Butane | 1.02 | 0.67 | 0.94 | 0.62 |
| Butylene | 5.77 | 3.94 | 4.80 | 3.29 |
| Total C$_3$'s | 7.27 | 4.24 | 6.72 | 3.92 |
| Propane | 1.33 | 0.76 | 1.30 | 0.74 |
| Propylene | 5.94 | 3.48 | 5.42 | 3.18 |
| LCO (221–232 C.) | 18.46 | 18.51 | 19.03 | 19.2 |
| Heavy Oil (332 + C.) | 11.53 | 12.93 | 11.34 | 12.81 |
| Total C$_3$ + Liquid | 109.50 | | 111.70 | |
| Coke | | 3.89 | | 2.73 |
| C$_2$ & Lighter | | 1.45 | | 1.43 |
| Hydrogen | | 0.22 | | 0.16 |
| Methane | | 0.39 | | 0.42 |
| Ethane | | 0.35 | | 0.50 |
| Ethylene | | 0.49 | | 0.35 |
| H2S (+contaminants) | | 1.64 | | 0.23 |
| Total | 100.00 | | 100.00 | |
| ECat Metals, ppm | | | | |
| Iron | 7400 | | 7000 | |
| Nickel | 900 | | 1000 | |
| Vanadium | 2100 | | 1700 | |

Figure 3:
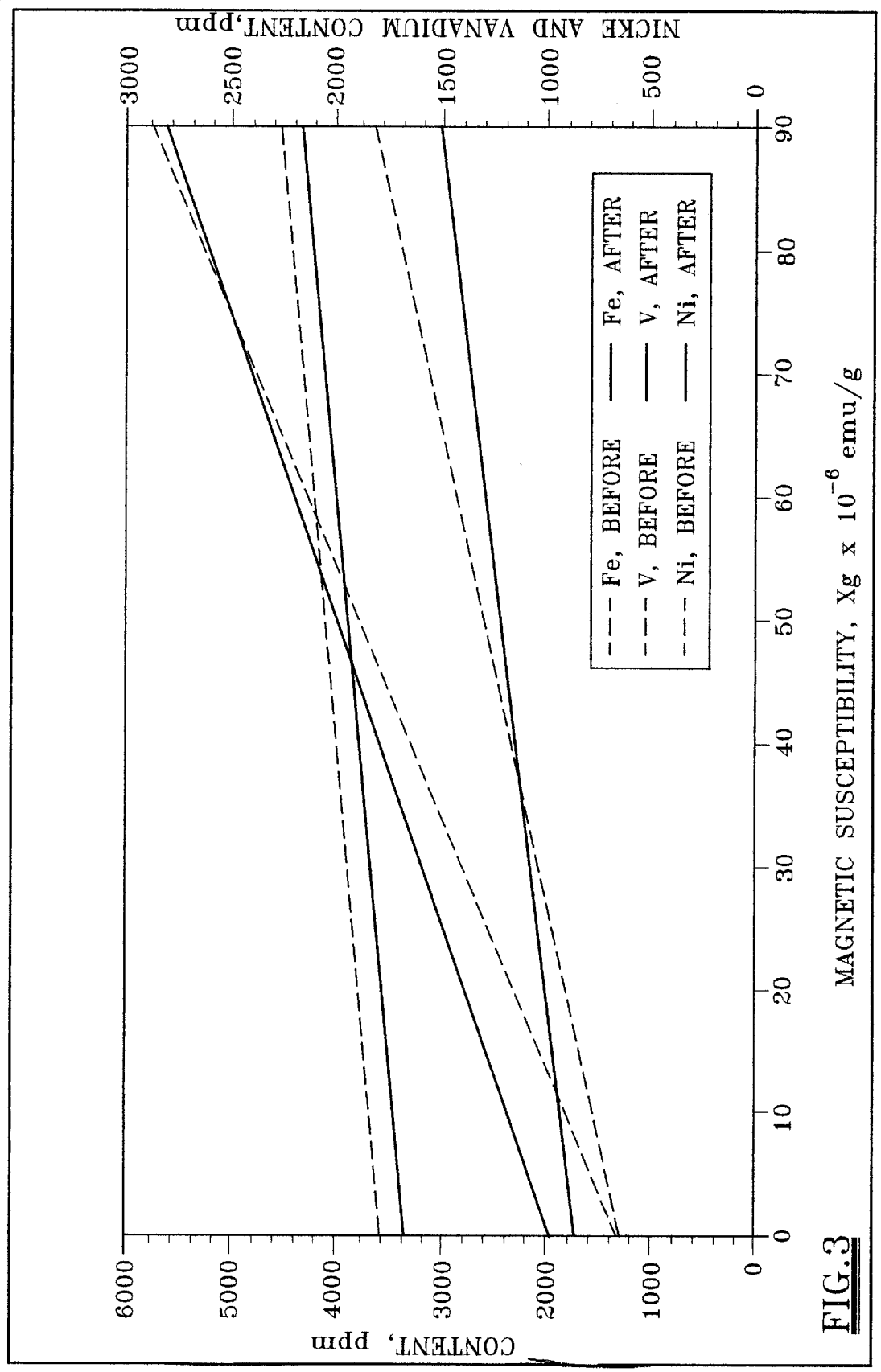
FIG. 3 shows FCC ECat metals before and after magnetic separation and conditioning.

FIG. 3 shows changes in magnetic susceptibility before and after magnetic separation. Consider Ni, which after eight months of magnetic separation processing showed more than a 20% change in Ni content at the same magnetic susceptibility, Xg. This shows an enhanced magnetic effect. This, coupled with the data in Table 1 show a reduced catalytic effect, both of which effects are consistent with smaller Ni crystals in the circulating ECat.

Figure 4:
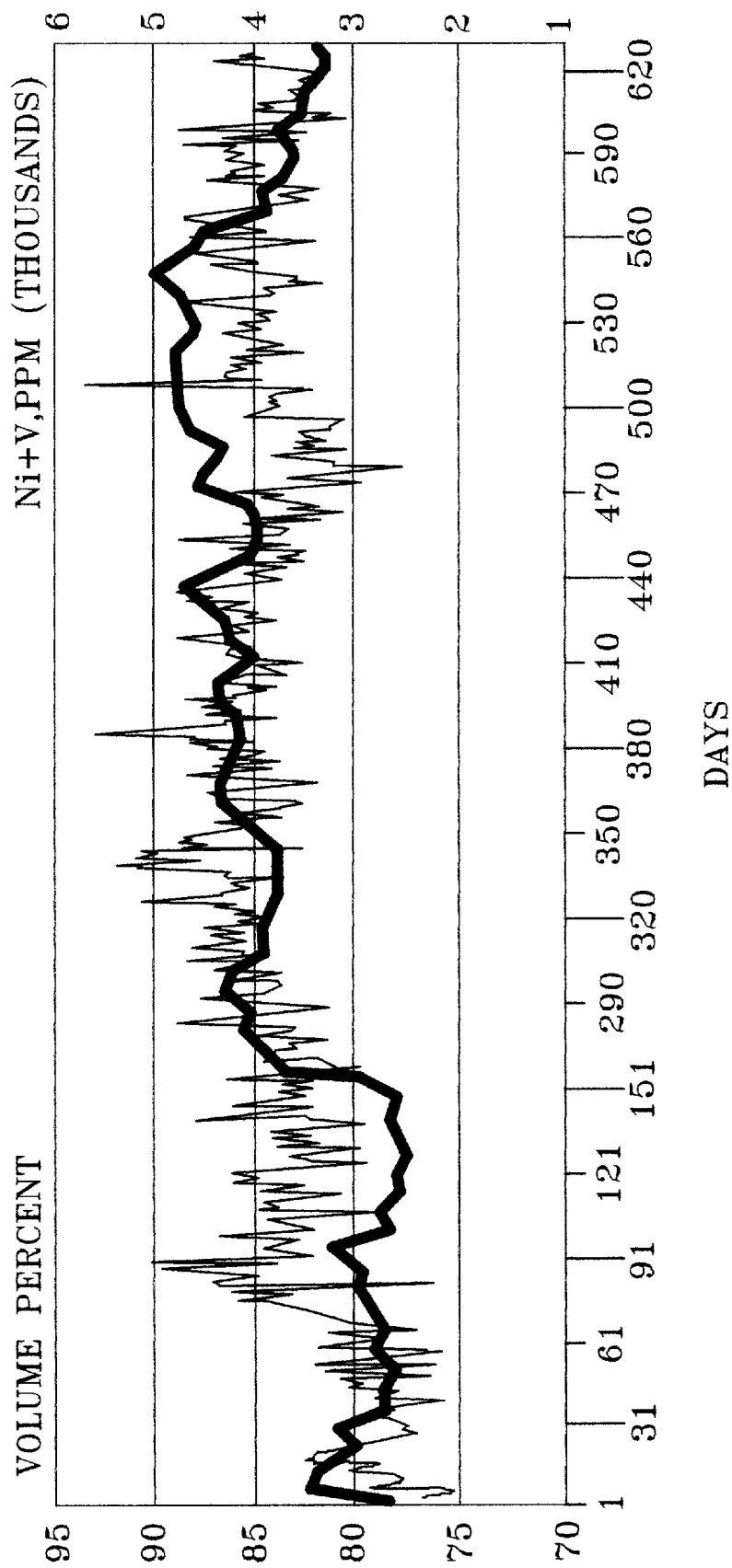
FIG. 4 shows the metals (Ni+V) level and gasoline selectivity of a plant initially operating without magnetic conditioning of the catalyst and then modified to magnetically separate and condition the catalyst.

FIG. 4 shows the Ni+V content and the gasoline selectivity for the FCC unit before and after magnetic separation and conditioning of the catalyst. Even though the Ni+V content of the ECat went up from about 3000 ppm before magnetic conditioning, the gasoline selectivity was at least as good and generally better than prior to magnetic conditioning. This result is quite surprising because it is contrary to the well known teaching of the prior art that NI and V act as catalyst poisons which tend to decrease gasoline selectivity and increase coke and hydrogen make.

Specific compositions, methods, or embodiments discussed above are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

We claim:

1. A process for the fluidized catalytic cracking (FCC) of a metals-contaminated hydrocarbon feed to lighter products comprising the steps of:

a) mixing a metals-contaminated, crackable hydrocarbon feedstock with a source of hot regenerated catalyst in a cracking reaction zone of an FCC unit to produce a mixture of cracked products and spent catalyst containing metals and coke deposited on the catalyst during the cracking reaction;

b) separating the spent catalyst from the cracked products;

c) removing the cracked products from the FCC unit;

d) stripping spent catalyst in a catalyst stripping zone by contact with stripping vapor to remove strippable hydrocarbons from the spent catalyst and produce stripped catalyst containing metals and coke;

e) regenerating the stripped catalyst in a catalyst regenerator at catalyst regeneration conditions including a temperature of 1000° to 1500° F. by contact with oxygen or an oxygen-containing gas to burn coke and produce regenerated, metals-contaminated catalyst which is recycled to the cracking reaction zone in step (a);

f) at least periodically removing catalyst from the FCC unit to produce a slipstream of metals-contaminated catalyst;

g) magnetizing or magnetically conditioning the metals-contaminated catalyst by passage through a magnetic field of sufficient strength to at least temporarily magnetize the metal-contaminated catalyst and produce conditioned catalyst;

h) recycling to the unit at least a portion of the conditioned catalyst;

i) cracking additional quantities of metal-contaminated feed with the conditioned catalyst and depositing additional amounts of feed metal on the conditioned catalyst; and j) increasing the Ni+V level on the conditioned catalyst without increasing hydrogen yield or coke make, as compared to the process operating at the same conditions prior to use of conditioned catalyst.

2. The process of claim 1 wherein the catalyst is conditioned by passage over a roller magnetic separator system.

3. The process of claim 1 wherein the catalyst is conditioned by passage over a rare earth roller magnetic separator system.

4. The process of claim 1 wherein conditioned catalyst is magnetically separated into a high metals content fraction which is discarded and a lower metals content fraction which is recycled to the FCC unit.

5. The process of claim 1 wherein the catalyst is conditioned over at least a six month period by withdrawing 1 to 20 percent per day of circulating catalyst inventory in the FCC unit, magnetizing or magnetically conditioning the withdrawn catalyst, and recycling at least a majority of the magnetized or magnetically conditioned catalyst to the FCC unit.

6. The process of claim 1 wherein the metals levels on conditioned catalyst are increased for at least a one month period.

7. The process of claim 1 wherein the metals with which the feedstock is contaminated are selected from the group of iron, nickel, vanadium, and mixtures and compounds thereof.

8. The process of claim 1 wherein an average crystal weight of metal deposits on the conditioned catalyst is at least 25 weight percent greater than an average crystal weight of metal deposits on the catalyst prior to magnetic conditioning.

9. The process of claim 1 wherein the metals level on conditioned catalyst increases at least 25 weight percent on an elemental metal basis.

10. A process for the fluidized catalytic cracking (FCC) of a metals-contaminated hydrocarbon feed to lighter products comprising:

a) mixing a crackable hydrocarbon feed containing at least one of nickel, iron, vanadium and compounds and combinations thereof with a source of hot regenerated catalyst in a cracking reaction zone of an FCC unit to produce a mixture of cracked products and spent catalyst containing coke and nickel, iron, vanadium or a combination thereof deposited on the catalyst during the cracking reaction;

b) separating the spent catalyst from the cracked products;

c) removing the cracked products from the process;

d) stripping spent catalyst in a catalyst stripping zone by contact with stripping vapor to remove strippable hydrocarbons from the spent catalyst and produce stripped catalyst containing coke and nickel, iron, vanadium or a combination thereof;

e) regenerating the stripped catalyst in a catalyst regenerator at catalyst regeneration conditions by contact with oxygen or an oxygen-containing gas at a temperature of 1000°–1500° F. in a fluidized bed to produce regenerated metals-contaminated catalyst containing an initial level of metals for recycle to the cracking reaction zone;

f) continuously removing catalyst from the FCC process to produce a flowing slipstream of metals-contaminated catalyst;

g) magnetizing or magnetically conditioning the metals-contaminated catalyst by passage through a magnetic field of sufficient strength to at least temporarily magnetize the metal-contaminated catalyst and produce conditioned catalyst;

h) magnetically and inertially separating the conditioned catalyst into a relatively high metal fraction which is discarded and a magnetized relatively low metal catalyst fraction;

i) recycling the relatively low metal catalyst fraction to the FCC process;

j) cracking additional quantities of nickel-, iron- or vanadium-contaminated feed with the magnetized low metal catalyst and depositing additional amounts of metals on the conditioned catalyst;

k) increasing the Ni+V level on the conditioned catalyst by at least 25 weight percent as compared to the initial metals level in step (e) without increasing hydrogen yield or coke make, as compared to the FCC process operating at the same conditions prior to use of conditioned catalyst in steps (f) through (j).

11. The process of claim 10 wherein conditioned catalyst is produced by passage over a roller magnetic separator system.

12. The process of claim 10 wherein conditioned catalyst is produced by passage over a rare earth roller magnetic separator system.

13. The process of claim 10 wherein conditioned catalyst is magnetically separated into a high metals content fraction which is discarded and a lower metals content fraction which is recycled to the FCC unit.

14. The process of claim 10 wherein catalyst is conditioned in step (g) over at least a six month period by withdrawing 1–20% per day of circulating catalyst inventory from seps (a) through (e), magnetizing or magnetically conditioning the withdrawn catalyst, and recycling at least a majority of the magnetized or magnetically conditioned catalyst to the FCC unit.

15. The process of claim 10 wherein the metals levels on conditioned catalyst are increased for at least a one month period.

16. The process of claim 10 wherein an average crystal weight of metal deposits on the conditioned catalyst is at least 10 weight percent larger than an average crystal weight of metal deposits on the catalyst at the initial metals level in step (e) prior to magnetic conditioning.

17. The process of claim 10 wherein an average crystal weight of metal deposits on the conditioned catalyst is at least 25 weight percent larger than an average crystal weight of metal deposits on catalyst at the initial metals level in step (e) prior to magnetic conditioning.

18. The process of claim 1 wherein the metals level on conditioned catalyst increases at least 25 weight percent on an elemental metal basis relative to the initial metals level in step (e).

19. In a process for the fluidized catalytic cracking (FCC) in an FCC unit of a hydrocarbon feed containing metals which deposit on a circulating stream of equilibrium catalyst (ECat) used in the FCC process to crack the feed, wherein metals contained in the feed and metals levels on the circulating ECat are insufficient to require either metals passivation by adding conventional metal passivators or catalyst replacement to control metals levels, and wherein catalyst replacement occurs on a daily to weekly basis to maintain catalyst activity rather than control metals content of circulating ECat, the improvement comprising the steps of:

a) continuously removing a portion of ECat from the unit;

b) magnetizing or magnetically conditioning the ECat, by passage through a magnetic field of sufficient strength to at least temporarily magnetize the metal-contaminated ECat and produce a conditioned ECat;

c) recycling the conditioned ECat to the FCC unit;

d) cracking additional quantities of metal-contaminated feed with the conditioned ECat, wherein the ECat, prior to magnetic conditioning, has a total nickel plus vanadium content below 2000 ppm, magnetic conditioning of ECat continues for at least two months, during which essentially all of the most metal contaminated fraction is recycled to the FCC unit, and wherein after the at least two months of operation magnetic conditioning of ECat continues in a magnetic separation unit operated to reject a metal contaminated fraction no greater than 10 weight percent of total catalyst charged to the magnetic separation unit.

20. The improvement of claim 19 wherein the magnetizing or magnetically conditioning step includes passing the removed ECat through an electromagnetic field or the magnetic field of a permanent magnet.

21. The improvement of claim 19 wherein the step of magnetizing or magnetically conditioning includes processing the removed ECat through a magnetic separator, wherein the conditioned ECat in step (b) contains a 20 weight percent most metal contaminated fraction, wherein the recycled conditioned ECat in step (d) includes from 50 to 100 weight percent of the most metal contaminated fraction for at least a month, and wherein after the at least one month period, at least a majority of the 20 weight percent most metal contaminated fraction is rejected by the magnetic separation unit.

* * * * *